United States Patent
Kwatra et al.

(10) Patent No.: US 11,012,869 B1
(45) Date of Patent: May 18, 2021

(54) DYNAMIC LIGHT FIDELITY (LIFI) EXTENDERS ROUTING

(71) Applicant: International Business Machines Corporation, Armonk, NY (US)

(72) Inventors: Shikhar Kwatra, Durham, NC (US); Srinivas Babu Tummalapenta, Broomfield, CO (US); Adam Lee Griffin, Dubuque, IA (US); HuyAnh Dinh Ngo, Sterling Heights, MI (US); Seng Chai Gan, Ashburn, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/794,032

(22) Filed: Feb. 18, 2020

(51) Int. Cl.
*H04W 16/26* (2009.01)
*H04B 10/116* (2013.01)
*H04W 88/04* (2009.01)
*H04W 84/18* (2009.01)
*H04W 12/06* (2021.01)
(Continued)

(52) U.S. Cl.
CPC .......... *H04W 16/26* (2013.01); *H04B 10/116* (2013.01); *H04W 4/021* (2013.01); *H04W 12/06* (2013.01); *H04W 84/005* (2013.01); *H04W 84/18* (2013.01); *H04W 88/04* (2013.01)

(58) Field of Classification Search
CPC ..... H04W 16/26; H04W 84/18; H04W 88/04; H04W 4/021; H04W 12/06; H04B 10/116
See application file for complete search history.

(56) References Cited

U.S. PATENT DOCUMENTS

| 9,806,811 B2 | 10/2017 | Poola et al. |
| 10,148,355 B1 | 12/2018 | Byers et al. |

(Continued)

FOREIGN PATENT DOCUMENTS

| CN | 105966423 A | 9/2016 |
| CN | 205847282 U | 12/2016 |

(Continued)

OTHER PUBLICATIONS

Airbus, "Li-Fi on Board", dated Mar. 26, 2017 (online) retrieved from the Internat at URL>https://www.airbus.com/newsroom/news/en/2017/03/Li-Fi.html, Total 3 pages.

(Continued)

*Primary Examiner* — Nam T Huynh
(74) *Attorney, Agent, or Firm* — Konrad, Raynes, Davda and Victor LLP; Janaki K. Davda

(57) ABSTRACT

Provided are techniques for dynamic LIFI extenders routing. One or more geographic locations of a physical region are identified based on historical crowd density, historical network traffic, current crowd density, and current network traffic. For each of the one or more geographic locations and a plurality of mobile bots, a mobile bot of the plurality of mobile bots is sent to that geographic location at a specified time, where the mobile bot provides a dynamic Light Fidelity (LIFI) extender router that acts as a network access point, and users at that geographic location are associated with the mobile bot, where each of the users has a LIFI enabled mobile device that communicates with a network of devices by sending data to the dynamic LIFI extender router via LIFI.

20 Claims, 7 Drawing Sheets

(51) Int. Cl.
*H04W 4/021* (2018.01)
*H04W 84/00* (2009.01)

(56) References Cited

U.S. PATENT DOCUMENTS

| | | | | |
|---|---|---|---|---|
| 2006/0114873 | A1* | 6/2006 | Fujii | H04W 72/1257 370/338 |
| 2014/0226983 | A1 | 8/2014 | Vargas | |
| 2015/0318922 | A1* | 11/2015 | Poola | H04B 10/116 398/45 |
| 2017/0019799 | A1* | 1/2017 | Djordjevic | B64C 39/024 |
| 2018/0220307 | A1* | 8/2018 | Mohammed | H04W 12/06 |
| 2019/0073518 | A1 | 3/2019 | Rao et al. | |
| 2019/0116505 | A1* | 4/2019 | Bhorkar | G06Q 50/01 |
| 2019/0149234 | A1 | 5/2019 | Burchardt et al. | |

FOREIGN PATENT DOCUMENTS

| | | |
|---|---|---|
| CN | 108650025 | 5/2018 |
| CN | 106209233 B | 10/2018 |
| WO | 2019006085 | 1/2019 |

OTHER PUBLICATIONS

Finn, "The Speed of Light: Li-Fi's Bright Future in the Aircraft Cabin" dated Jun. 18, 2018, (online) retrieved from the Internat at URL>https://www.wearefinn.com/topics/posts/the-speed-of-light-li-fi-s-bright-future-in-the-aircraft-cabin, Total 11 pages.

"LiFi Technology" (online) retrieved from the Internet on Jan. 16, 2020 at URL>https://purelifi.com/lifi-technology/, Total 11 pages.

Yerman, "Speed of Li-Fi: A Bright Idea for In-Flight Connectivity" dated May 15, 2018, Total 7 pages.

Alshaer, "Bidirectional LiFi Attocell Access Point Slicing Scheme", dated Sep. 2018, IEEE Transactions on Network and Service Management, vol. 15, No. 3, Total 14 pages.

Wang et al., "Fuzzy Logic Based Dynamic Handover Scheme for Indoor Li-Fi and RF Hybrid Network" dated 2016, IEEE International Conference on Communications (ICC)—Optical Networks and Systems,Total 6 pages.

Railway Gazette Events, dated Feb. 11, 2020, (online) retrieved from the Internet at URL>https://www.smartrailworld.com/it-and-wifi/bombardier-signs-700-\million-deal-with-ibm-to-boost-it-innovation-and-reduce-costs, Total 3 pages.

* cited by examiner

DYNAMIC LIGHT FIDELITY (LIFI) EXTENDERS ROUTING

BACKGROUND

Embodiments of the invention relate to dynamic Light Fidelity (LIFI) extenders routing.

LIFI may be described as a high speed, bidirectional, networked and mobile communication of data using visible light (e.g., Light-Emitting Diodes (LEDs)), non-visible light (e.g., Ultraviolet (UV)), and/or infrared light spectrums. LIFI may be formed by multiple light bulbs that form a wireless network. On the other hand, WIFI uses radio frequency to transmit data.

Also, LIFI is considered to be more secure that WIFI because LIFI may be contained to a physical region. With WIFI, for example, one may pick up a neighbor's signal without much effort. However, with LIFI, simply focusing a more direct beam to a focused area and/or the act of closing a door may limit the shared spectrum of LIFI to other parties/users. Light also does not "bleed" through walls or other barriers, and light does not wander into environments signal owners may prefer to avoid.

SUMMARY

In accordance with certain embodiments, a computer-implemented method is provided for dynamic LIFI extenders routing. The computer-implemented method comprises operations. One or more geographic locations of a physical region are identified based on historical crowd density, historical network traffic, current crowd density, and current network traffic. For each of the one or more geographic locations and a plurality of mobile bots, a mobile bot of the plurality of mobile bots is sent to that geographic location at a specified time, where the mobile bot provides a dynamic Light Fidelity (LIFI) extender router that acts as a network access point, and users at that geographic location are associated with the mobile bot, where each of the users has a LIFI enabled mobile device that communicates with a network of devices by sending data to the dynamic LIFI extender router via LIFI.

In accordance with other embodiments, a computer program product is provided for dynamic LIFI extenders routing. The computer program product comprises a computer readable storage medium having program code embodied therewith, the program code executable by at least one processor to perform operations. One or more geographic locations of a physical region are identified based on historical crowd density, historical network traffic, current crowd density, and current network traffic. For each of the one or more geographic locations and a plurality of mobile bots, a mobile bot of the plurality of mobile bots is sent to that geographic location at a specified time, where the mobile bot provides a dynamic Light Fidelity (LIFI) extender router that acts as a network access point, and users at that geographic location are associated with the mobile bot, where each of the users has a LIFI enabled mobile device that communicates with a network of devices by sending data to the dynamic LIFI extender router via LIFI.

In accordance with yet other embodiments, a computer system is provided for dynamic LIFI extenders routing. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. One or more geographic locations of a physical region are identified based on historical crowd density, historical network traffic, current crowd density, and current network traffic. For each of the one or more geographic locations and a plurality of mobile bots, a mobile bot of the plurality of mobile bots is sent to that geographic location at a specified time, where the mobile bot provides a dynamic Light Fidelity (LIFI) extender router that acts as a network access point, and users at that geographic location are associated with the mobile bot, where each of the users has a LIFI enabled mobile device that communicates with a network of devices by sending data to the dynamic LIFI extender router via LIFI.

Thus, embodiments advantageously create network access points for clusters of users as needed. In addition, the mobile bots move through space and time to provide dynamic LIFI extender routers.

In accordance with additional embodiments, the dynamic LIFI extender router provides authentication of a user using the LIFI enabled mobile device to access an internet service provided by a device in the network of devices.

In accordance with yet additional embodiments, target audience leaning criteria is used to route each mobile bot in the plurality of mobile bots in time and space. This allows for prioritizing where each mobile bot should be routed.

In accordance with further embodiments, one or more mobile bots in the plurality of mobile bots receives a traversal route that indicates multiple locations at different times. This advantageously allows each mobile bot to move to different geographic locations in the traversal route as needed to provide new network access points.

In accordance with yet further embodiments, one or more traversal routes of each mobile bot of the plurality of mobile bots are stored for future reconfiguration and optimization. This advantageously allows for the use of historical traversal routes in determining future traversal routes.

In accordance with other embodiments, the plurality of mobile bots, a monitoring and control system, and a plurality of cameras are embedded in a scatternet ecosystem. This advantageously allows the plurality of mobile bots to communicate with the monitoring and control system to receive traversal routs and allows the monitoring and control system to communicate with the cameras to obtain data for use in determining the traversal routes.

In accordance with yet other embodiments, the dynamic Light Fidelity (LIFI) extender router communicates with the network of devices via one of LIFI and WIFI. This advantageously uses either LIFI or WIFI to access the network of devices.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In physical regions, there may be a desire by users to access the internet (e.g., high speed internet). Examples of physical regions include cafes, airports, airplanes, terminals of airports, baggage areas of airports, libraries, college campuses, bus stations, buses, train stations, trains, autonomous passenger pods, etc. In certain embodiments, the physical regions are confined regions (e.g., which are confined by walls, doors, etc.). Users value the ability to connect to work, entertainment, friends, and family using high speed internet. Embodiments provide predictive on-demand network access points or mobile extenders for LIFI with seamless authentication. The network access points for users are created at geographic locations within the physical regions based on estimating network traffic and crowd density.

Figure 1:
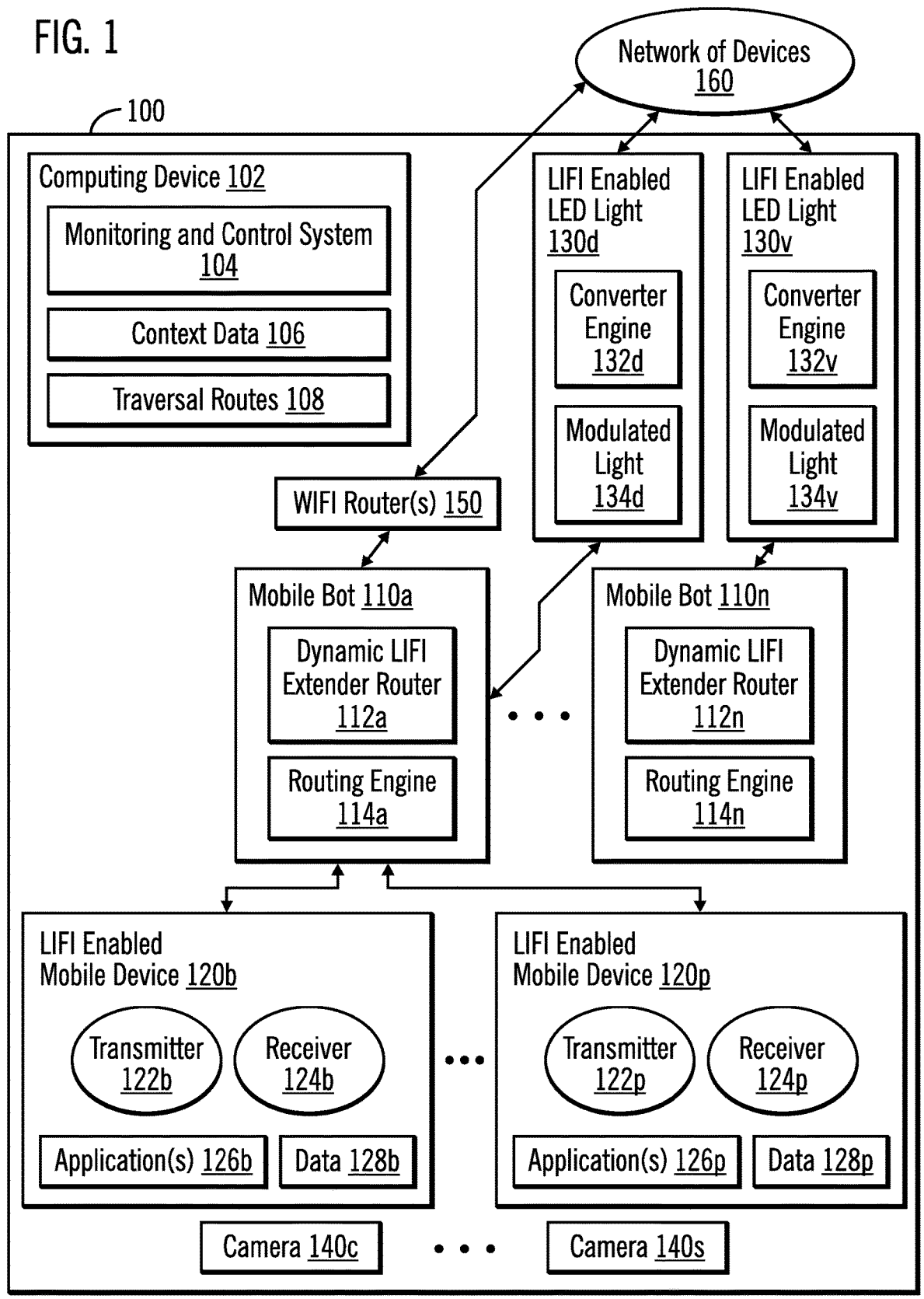
FIG. 1 illustrates, in a block diagram, a computing environment in accordance with certain embodiments.

FIG. 1 illustrates, in a block diagram, a computing environment in accordance with certain embodiments. In FIG. 1, a physical region 100 includes a computing device 102, which includes a monitoring and control system 104 that monitors the physical region 100 for crowd density of users who are present in the physical region 100 and for network traffic of the users' LIFI enabled mobile devices 120b . . . 120p in the physical region 100. The computing device 102 also stores context data 106 and traversal routes 108. In certain embodiments, the context data 106 includes corpus data (e.g., user information, historical data on each LIFI extender router 112a . . . 112n, historical crowd density, and historical network bandwidth), current crowd density, and current network traffic. In certain embodiments, one or more traversal routes 108 is stored for each of the mobile bots 110a . . . 110n to provide historical and current traversal routes. In certain embodiments, the traversal route 108 for a mobile bot 110a . . . 110n stores one or more geographic locations that the mobile bot 110a . . . 110n traveled to, times at which the mobile bot 110a . . . 110n was at each of the one or more geographic locations, and the period of time that the mobile bot 110a . . . 110n stayed at each of the one or more geographic locations.

The monitoring and control system 104 identifies geographic locations within the physical region 100 based on one or both of the crowd density and the network traffic and creates new LIFI network access points at those geographic locations. The LIFI network access points allow the LIFI enabled mobile devices 120b . . . 120p to access the network of devices 160. Each LIFI enabled mobile device 120b . . . 120p may be any computing device, such as a smartphone, a tablet computer, a laptop computer, etc. The network of devices 160 may be the internet, an intranet, a cloud infrastructure, etc.

In FIG. 1, there are one or more mobile bots 110a . . . 110n. Each of the mobile bots 110a . . . 110n provides a dynamic Light Fidelity (LIFI) extender router 112a . . . 112n and a routing engine 114a . . . 114n. The dynamic LIFI extender routers 112a . . . 112n provide LIFI network extenders and are mounted on the mobile bots 110a . . . 110n. The routing engines 114a . . . 114n communicate via a wireless network with the monitoring and control system 104. The monitoring and control system 104 instructs a routing engine 114a . . . 114n to move the mobile bot 110a . . . 110n to a respective geographic location of the physical region 100 responsive to the monitoring and control system 104 determining that a new, dynamic LIFI network access point is useful in that geographic location of the physical region 100. Each mobile bot 110a . . . 110n may be a robot that is able to move through the physical region 100, where the physical region 100 may include many rooms or separated areas, doorways, etc. Each mobile bot 110a . . . 110n moves autonomously in space (through the physical region 100) and time (by moving to different geographic locations at different times). In certain embodiments, each dynamic LIFI extender router 112a . . . 112n may have an indication of what current crowd density and current network traffic that the dynamic LIFI extender routers 112a . . . 112n is best suited to handle.

Cameras 140c . . . 140s monitor the physical region 100 and perform Visual Simultaneous Localization and Mapping (VSLAM) of users in the physical region 100. The monitoring and control system 104 determines that a new LIFI network access point is to be created in a geographic location of the physical region 100 by identifying a cluster of users in that geographic location, based on network traffic in that geographic location or both via the VSLAM and a clustering technique (such as K-means clustering or density clustering).

Each LIFI enabled mobile device 120b . . . 120p stores one or more applications 126b . . . 126p and data 128b . . . 128p. Also, each LIFI enabled mobile device 120b . . . 120p includes a transmitter 122b . . . 122p and a receiver 124b . . . 124p. Each transmitter 122b . . . 122p converts data to light and transmits the data as light. Each receiver 124b . . . 124p receives data as light and converts that light to data processed by the LIFI enabled mobile device 120b . . . 120p.

In FIG. 1, there are one or more LIFI enabled LED lights 130d . . . 130v. Each LIFI enabled LED light 130d . . . 130v is coupled to the network of devices 160, which may include LIFI enabled devices. Each LIFI enabled LED light 130d . . . 130v includes a converter engine 132d . . . 132v that is able to convert data (from a device of the network of devices 160) to modulated light 134d . . . 134v. The converter engine 132d . . . 132v converts a beam of light into the modulated light 134d . . . 134v, which acts as an electrical signal that is sent to the mobile bot 110a . . . 110n and routed to the receiver 124b . . . 124p of the LIFI enabled mobile device 120b . . . 120p, and the electrical signal is converted to data by the receiver 124b . . . 124p. The transmitter 122b . . . 122p sends data as light to the mobile bot 110a . . . 110n, which routes the data as light to the LIFI enabled LED light 130d . . . 130v for conversion to data that is sent to a device in the network of devices 160.

Thus, embodiments allow the LIFI enabled mobile devices 120b . . . 120p to communicate via the mobile bot 110a . . . 110n with the internet of devices 160. The mobile bots 110a . . . 110n provide new network access points (i.e., points of access to the network of devices 160) at specific geographic locations and at particular times.

In particular, each dynamic LIFI extender router 112a . . . 112n automatically creates a new network access point to allow one or more LIFI enabled devices to access the network of devices 160, which increases network bandwidth based on network traffic for a given geographic ("geo") location. For example, in FIG. 1, the dynamic LIFI extender router 112a automatically creates a new network access point to allow the LIFI enabled mobile devices 120b . . . 120p to access the network of devices 160 via the LIFI enabled LED light 130d.

In certain embodiments, one or more WIFI routers 150 are available to allow the dynamic LIFI extender routers 112a . . . 112n to communicate with the network of devices 160 either via LIFI or via WIFI.

The monitor and control system 104 may use VSLAM protocol to assess an environment in order to monitor crowd density. The VSLAM protocol may be described as a technique for determining the position and orientation of a sensor (e.g., of a LIFI enabled device 120b . . . 120p) in a physical region 100, while mapping the physical region 100 around that sensor.

The computing device 102, the mobile bots 110a . . . 110n, and the cameras 140c . . . 140s (a type of device) may be embedded in a scatternet ecosystem for distribution based on location-specific need-based geographic locations. The scatternet ecosystem may be described as a type of ad hoc computer network with two or more piconets, where each of the piconets is a type of connection that is formed between two or more wireless devices (e.g., Bluetooth® enabled devices) (Bluetooth is a registered trademark of Bluetooth SIG in the United States and/or other countries).

The cameras 140c . . . 140s may be VSLAM Capture Video (CV) cameras. The monitor and control system 104 may assess VSLAM enabled CV cameras to inspect users in the physical region 100 and to inspect the LIFI enabled mobile devices 120b . . . 120p being accessed by those users.

Figure 2:
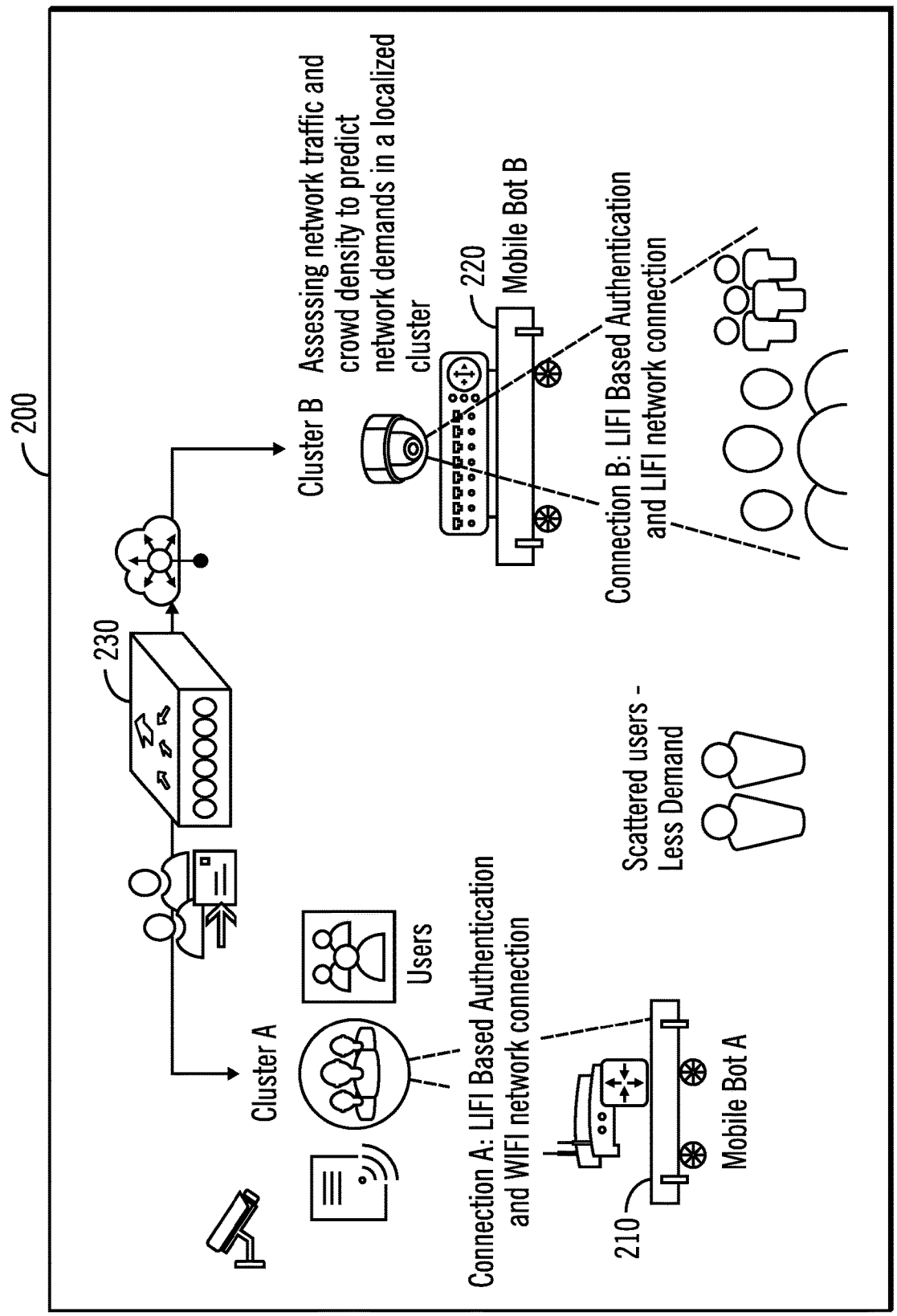
FIG. 2 illustrates an example usage of mobile bots in accordance with certain embodiments.

FIG. 2 illustrates an example usage of mobile bots in accordance with certain embodiments. FIG. 2 illustrates a physical region 200 that includes mobile bot A 210 with a dynamic LIFI extender router and mobile bot B with a dynamic LIFI extender router. The monitoring and control system 104 analyzes network traffic and crowd density to predict network demands in a localized, physical region (e.g., a confined environment) for clusters of users and sends mobile bot A 210 and mobile bot B 220 to geographic locations in the physical region 200 at particular times and, optionally, for particular periods of time. In certain embodiments, the geographic locations may be described using latitude and longitude (x, y) coordinates. In other embodiments, the geographic locations may have names (e.g., room A, western wing, etc.) that map to certain latitude and longitude coordinates. In this example, mobile bot A 210 is associated with the users of cluster A and enables the users to access the internet 230 via LIFI based authentication and a WIFI or LIFI internet connection. In this example, mobile bot B 220 is associated with the users of cluster B and enables the users to access the internet via a LIFI based authentication and network connection.

Figure 3:
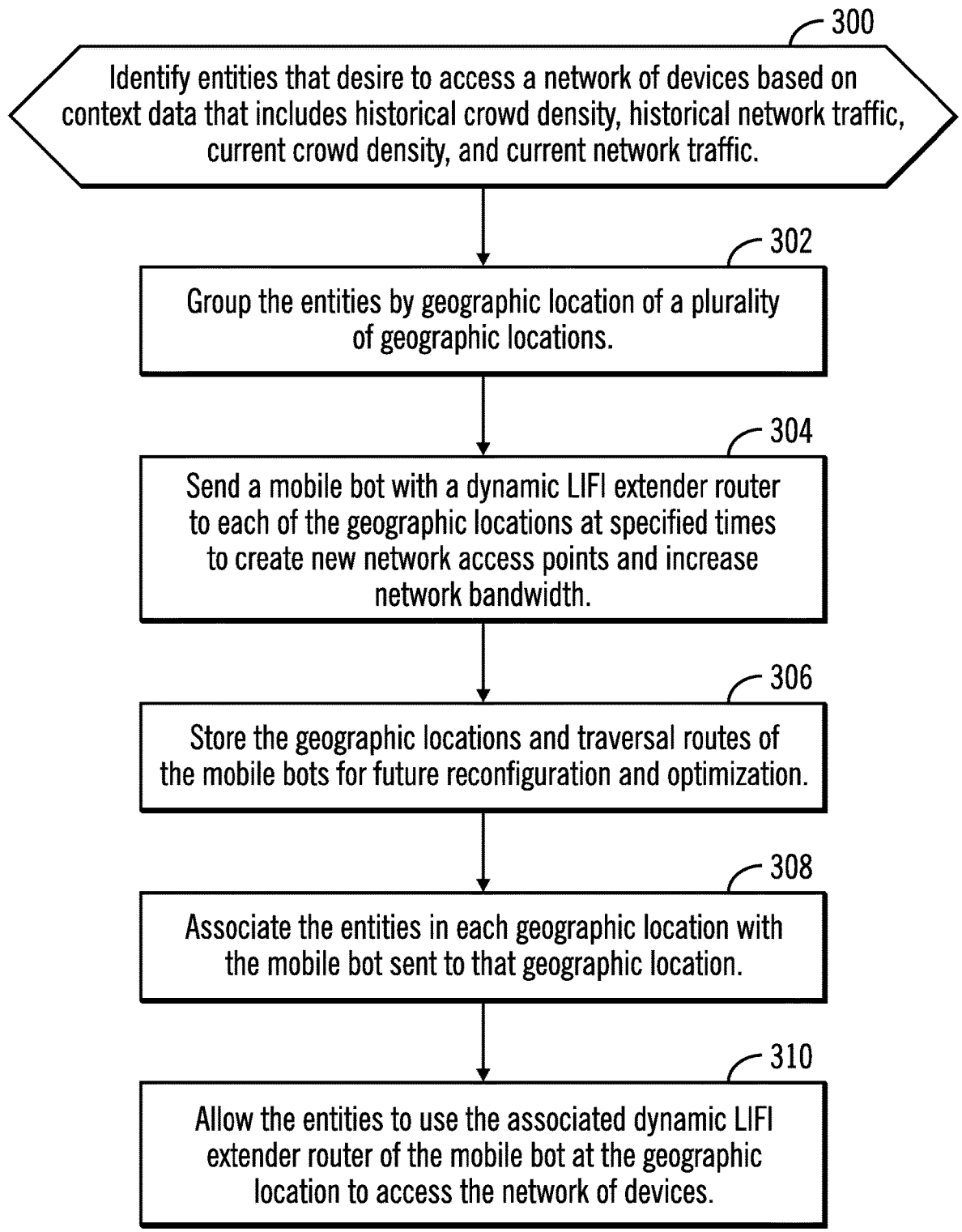
FIG. 3 illustrates, in a flowchart, operations for routing mobile bots in accordance with certain embodiments.

FIG. 3 illustrates, in a flowchart, operations for routing mobile bots in accordance with certain embodiments. Control begins at block 300 with the monitor and control system 104 identifying entities (e.g., users or LIFI enabled mobile device 120b . . . 120p) that desire to access the network of devices 160 based on context data that includes historical crowd density, historical network traffic, current crowd density, and current network traffic. The crowd density and network traffic may be obtained via VSLAM.

In block 302, the monitor and control system 104 groups the entities by geographic location of a plurality of geographic locations. The grouping may use various clustering techniques. Grouping the entities may be described as forming groups of entities based on geographic locations. For example, one group of entities may be in geographic location A, while another group of entities may be in geographic location B.

In block 304, the monitor and control system 104, sends a mobile bot 110a . . . 110n with a dynamic LIFI extender router 112a . . . 112n to each of the geographic locations at specified times to create new network access points and increase network bandwidth.

In certain embodiments in which there are more geographic locations than mobile bots, the monitor and control system 104 prioritizes the geographic locations based on one or more factors (e.g., a geographic location with a larger number of entities has a higher priority, a geographic location that has more network traffic has a higher priority, etc.) and sends the mobile bots 110a . . . 110n to the geographic locations based on the priorities. In certain embodiments, each mobile bot 110a . . . 110n is sent a traversal route that specifies geographic locations and associated times (e.g., room A at 10:00 am, room B at 11:00 am, etc.), and the mobile bot 110a . . . 110n follows the traversal route by moving to the locations at the specified times. In certain embodiments, the traversal route specifies geographic locations and period of time to remain at each of the geographic locations (e.g., room A for one hour, room B for 40 minutes, etc.). Thus, the mobile bot 110a . . . 110n provides new network access points in space and time.

In block 306, the monitor and control system 104 stores the geographic locations and traversal routes of the mobile bots 110a . . . 110n for future reconfiguration and optimization. In block 308, the monitor and control system 104 associates the entities in each geographic location with the mobile bot 110a . . . 110n sent to that geographic location. In block 310, the monitor and control system 104 allows the entities to use the associated dynamic LIFI extender router 112a . . . 112n of the mobile bot 110a . . . 110n at the geographic location to access the network of devices 160.

Figure 4:
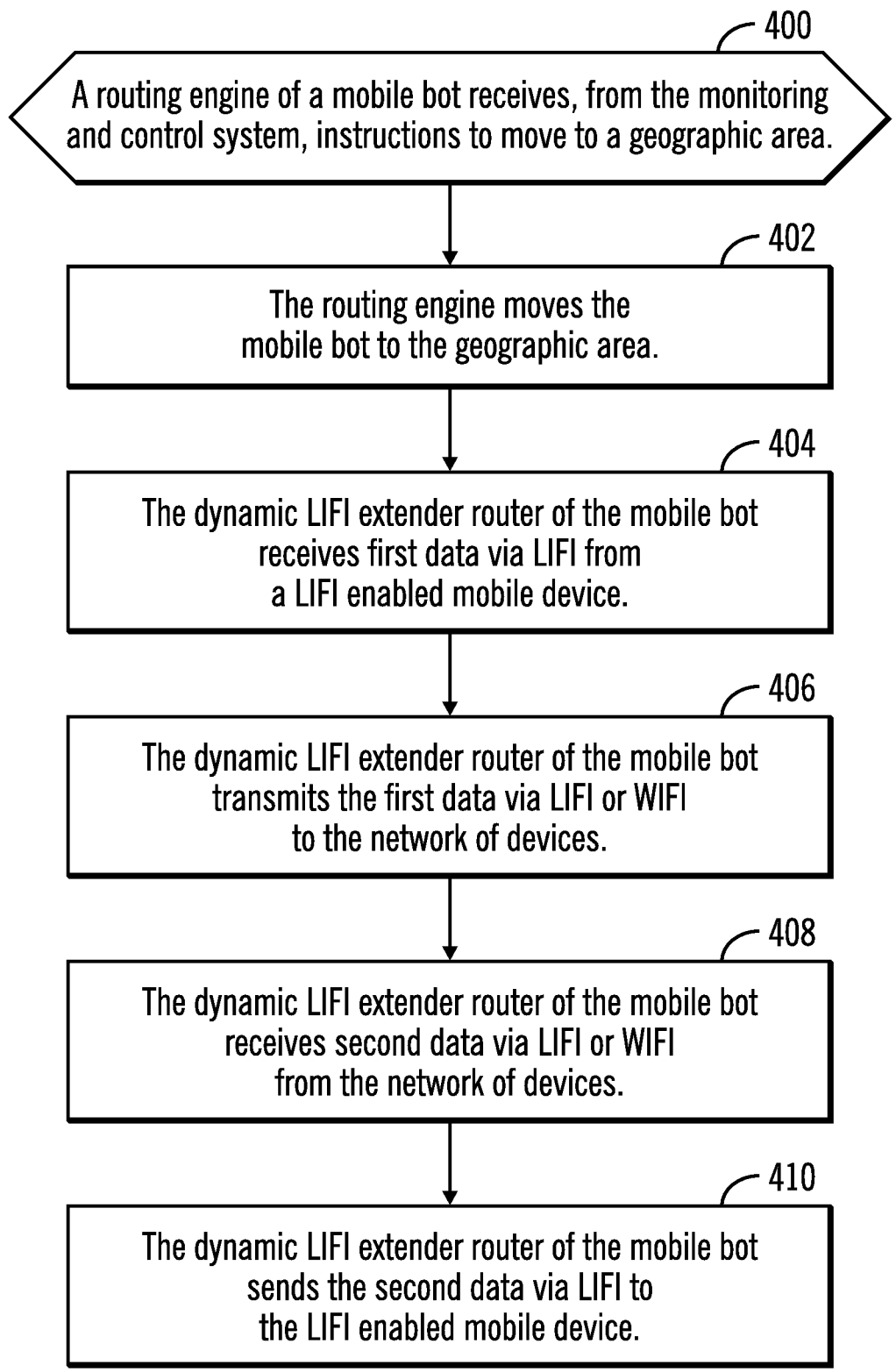
FIG. 4 illustrates, in a flowchart, operations for routing data using a dynamic LIFI extender router in accordance with certain embodiments.

FIG. 4 illustrates, in a flowchart, operations for routing data using a dynamic LIFI extender router 112a . . . 112n in accordance with certain embodiments. In block 400, a routing engine 114a . . . 114n of a mobile bot 110a . . . 110n receives, from the monitoring and control system 104, instructions to move to a geographic area. In block 402, the routing engine 114a . . . 114n moves the mobile bot 110a . . . 110n to the geographic area.

In block 404, the dynamic LIFI extender router 112a . . . 112n of the mobile bot 110a . . . 110n receives first data ("originating data" or "device data") via LIFI from a LIFI enabled mobile device 120b . . . 120p. In block 406, the dynamic LIFI extender router 112a . . . 112n of the mobile bot 110a . . . 110n transmits the first data via LIFI or WIFI to the network of devices 160. In block 408, the dynamic LIFI extender router 112a . . . 112n of the mobile bot 110a . . . 110n receives second data ("response data" or "network data") via LIFI or WIFI from the network of devices 160. In block 410, the dynamic LIFI extender router 112a . . . 112n of the mobile bot 110a . . . 110n sends the second data via LIFI to a the LIFI enabled mobile device 120b . . . 120p.

In certain embodiments, before sending the first data to the network of devices 160, the dynamic LIFI extender router 112a . . . 112n authenticates the LIFI enabled mobile device 120b . . . 120p.

Figure 5:
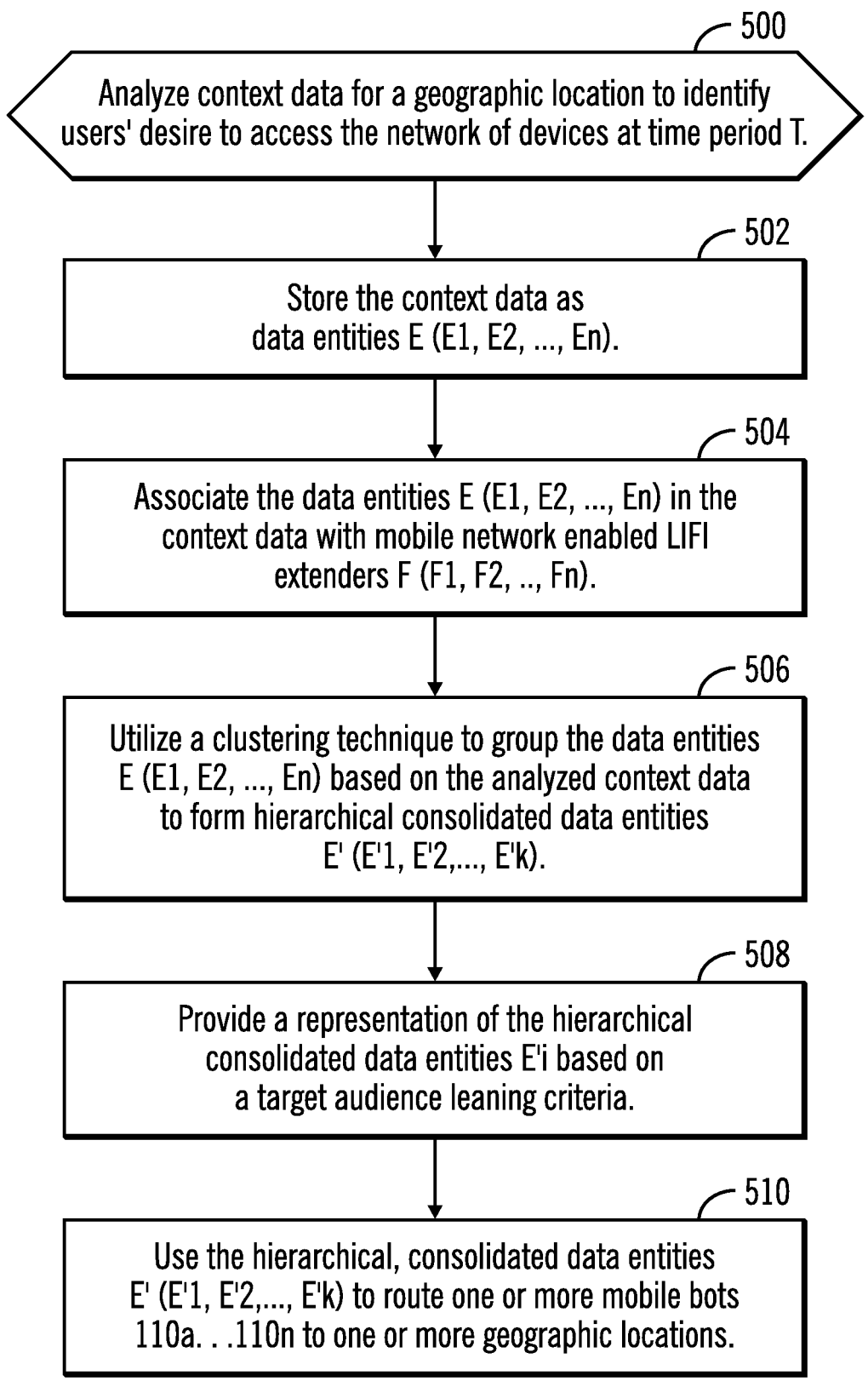
FIG. 5 illustrates, in a flowchart, operations for routing mobile bots in accordance with certain embodiments.

FIG. 5 illustrates, in a flowchart, operations for routing mobile bots in accordance with certain embodiments. In block 500, the monitor and control system 104 analyzes context data for a physical region to identify users' desire to access the network of devices 160 at a particular time period T. In certain embodiments, the context data is corpus data (e.g., user information, historical data on each LIFI extender router 112a . . . 112n, historical crowd density, and historical network bandwidth), current crowd density, and current network traffic. Thus, the monitor and control system 104 correlates historical data found in previous assignments of dynamic LIFI extender routers 112a . . . 112n with new information on current crowd density and current network traffic.

In block 502, the monitor and control system 104 stores the context data for the users as data entities E (E1, E2, . . . , En). In certain embodiments, each data entity corresponds to a user ("entity"). In certain embodiments, the data entities E (E1, E2, . . . En) are stored in a data structure, such as a file or a table.

In block 504, the monitor and control system 104 associates the data entities E (E1, E2, . . . , En) in the context data with the dynamic LIFI extender routers F (F1, F2, . . . , Fn). In certain embodiments, this is done by matching the current crowd density and current network traffic of a current data entity with a dynamic LIFI extender router 112a . . . 112n based on historical and current crowd density and network traffic. In certain embodiments, this is done by matching how close the dynamic LIFI extender routers 112a . . . 112n are to the crowds represented by the crowd density.

In block 506, the monitor and control system 104 utilizes a clustering technique (e.g., K-means clustering or density based clustering) to group the data entities E (E1, E2, . . . , En) based on the analyzed context data to form hierarchical, consolidated data entities E' (E'1, E'2, . . . , E'k). The hierarchical, consolidated data entities may be clustered so that each cluster is associated with a geographic location in the physical region. In this manner, users are clustered so that a dynamic LIFI extender router 112a . . . 112n may be moved to that cluster.

In block 508, the monitor and control system 104 provides a representation of the hierarchical consolidated data entities E'i based on a target audience leaning criteria. In certain embodiments, the target audience leaning criteria is based on a scoring selected from a group consisting of natural language processing (NLP), crowd density, devices (i.e., LIFI enabled mobile devices 120b . . . 120p) requiring network connectivity, geolocation and temporal metrics. This allows for routing the dynamic LIFI extender routers F (F1, F2, . . . , Fn) to specific locations in time and space.

For example, some entities (E1-E3) are clustered into a first category (South) and other entities (E4-E6) are clustered into a second category (e.g., using K-means clustering) based on a different geographic location. Then, the mobile bots 110a . . . 110n with the dynamic LIFI extender routers 112a . . . 112n reposition themselves based on minimizing the distance with respect to the first cluster and the second cluster that were created by grouping the entities together based on geo-spatial mapping. In certain embodiments, the mobile bots 110a . . . 110n with the dynamic LIFI extender routers 112a . . . 112n keep repositioning until they find local/global optima by maximizing the network bandwidth and dedicated connections with the clusters. In certain embodiments, hierarchical entities signify the correlation of entity clusters (users' LIFI enabled mobile devices 120b . . . 120p requiring bandwidth with the mobile bots 110a . . . 110n with the dynamic LIFI extender routers 112a . . . 112n based on their needs (which maybe in some prioritized fashion (e.g., entities downloading flight tickets may be a higher priority that other entities scrolling through internet pages)).

In block 510, the monitor and control system 104 uses the hierarchical, consolidated data entities E' (E'1, E'2, . . . , E'k) to route one or more mobile bots 110a . . . 110n to the one or more geographic locations.

Figure 6:
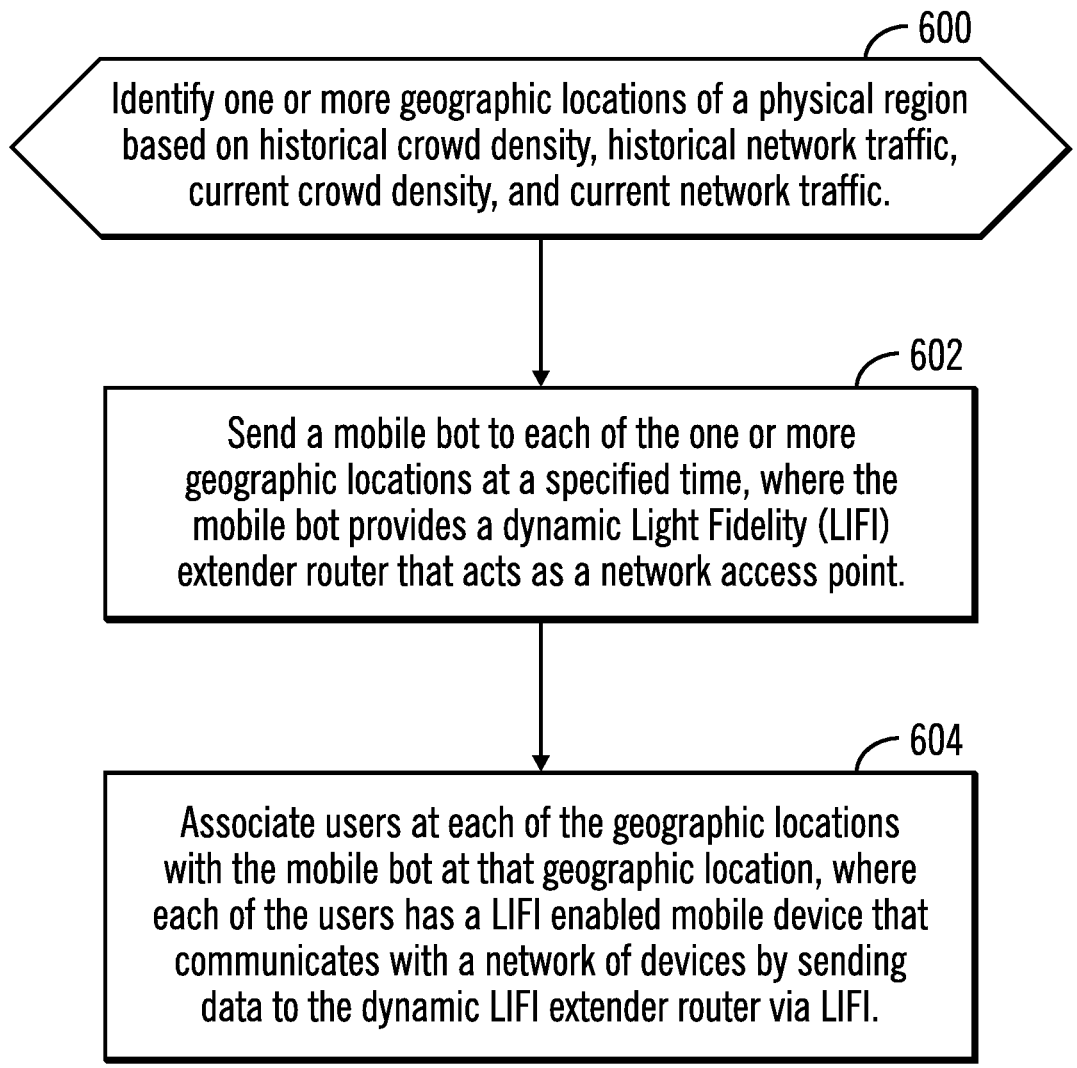
FIG. 6 illustrates, in a flowchart, operations for providing dynamic LIFI extender routers to clusters in accordance with certain embodiments.

FIG. 6 illustrates, in a flowchart, operations for providing dynamic LIFI extender routers 112a . . . 112n to clusters in accordance with certain embodiments. Control begins at block 600 with the monitor and control system 104 identifying one or more geographic locations of a physical region based on historical crowd density, historical network traffic, current crowd density, and current network traffic. In block 602, the monitor and control system 104 sends a mobile bot 110a . . . 110n to each of the one or more geographic locations at a specified time, where the mobile bot 110a . . . 110n provides a dynamic LIFI extender router 112a . . . 112n that acts as a network access point. In block 604, the monitor and control system 104 associates users at each of the geographic locations with the mobile bot 110a . . . 110n at that geographic location, where each of the users has a LIFI enabled mobile device 120b . . . 120p that communicates with a network of devices 160 by sending data to the dynamic LIFI extender router 112a . . . 112n of the associated mobile bot 110a . . . 110n via LIFI.

The monitor and control system 104 instructs mobile bots 110a . . . 110n in the scatternet or adhoc based mesh network to spread or route to the geographic locations based on understanding the context data in time and space. The monitor and control system 104 stores the cluster of locations G (G1, G2, . . . , Gn) where the dynamic LIFI extender routers F (F1, F2, . . . , Fn) traversed or were autonomously routed for future reconfiguration or optimization of location/time based demand satisfaction.

The dynamic LIFI extender routers 112a . . . 112n may be used for various networks, such as city WIFI, airports, parks, universities, etc.

Thus, embodiments enhance seamless authentication and LIFI based network extensions based on a leaning relevancy targeted to recipients.

With embodiments, the master system instructs the mobile bots 110a . . . 110n with dynamic LIFI extender routers 112a . . . 112n in the scatternet or adhoc based mesh network to spread or route to the consolidated entities in geographic locations (zones) based on understanding the context data in time and space. Embodiments store the cluster of locations G (G1, G2, . . . , Gn), where the dynamic LIFI extender routers traversed or autonomously routed for future reconfiguration or optimization of location/time based demand satisfaction. The dynamic LIFI extender routers support global authentication for users leveraging services, such as internet services (e.g., in plane, airport, restaurants, shops, etc.) provided by a device in the network of devices 160. The global authentication may be any authentication technique (e.g., username/password, thumbprint, etc.). The monitoring and control system 104 authenticates the user with local proximity and physical boundaries (i.e., the authorized user in a known location is allowed to access the network of devices 160).

Embodiments use the VSLAM protocol to assess the environment for crowd density to create dynamic LIFI access points to the network of devices 160.

Embodiments using LIFI avoid the issues of using WIFI in public places. That is, unlike WIFI, which is a shared connection, which may be poorly secured, which may be vulnerable to attack, and/or which may be vulnerable to ease dropping, LIFI is typically in a confined region as the light used for LIFI does not leak through barriers, such as walls, and so is more secure.

Figure 7:
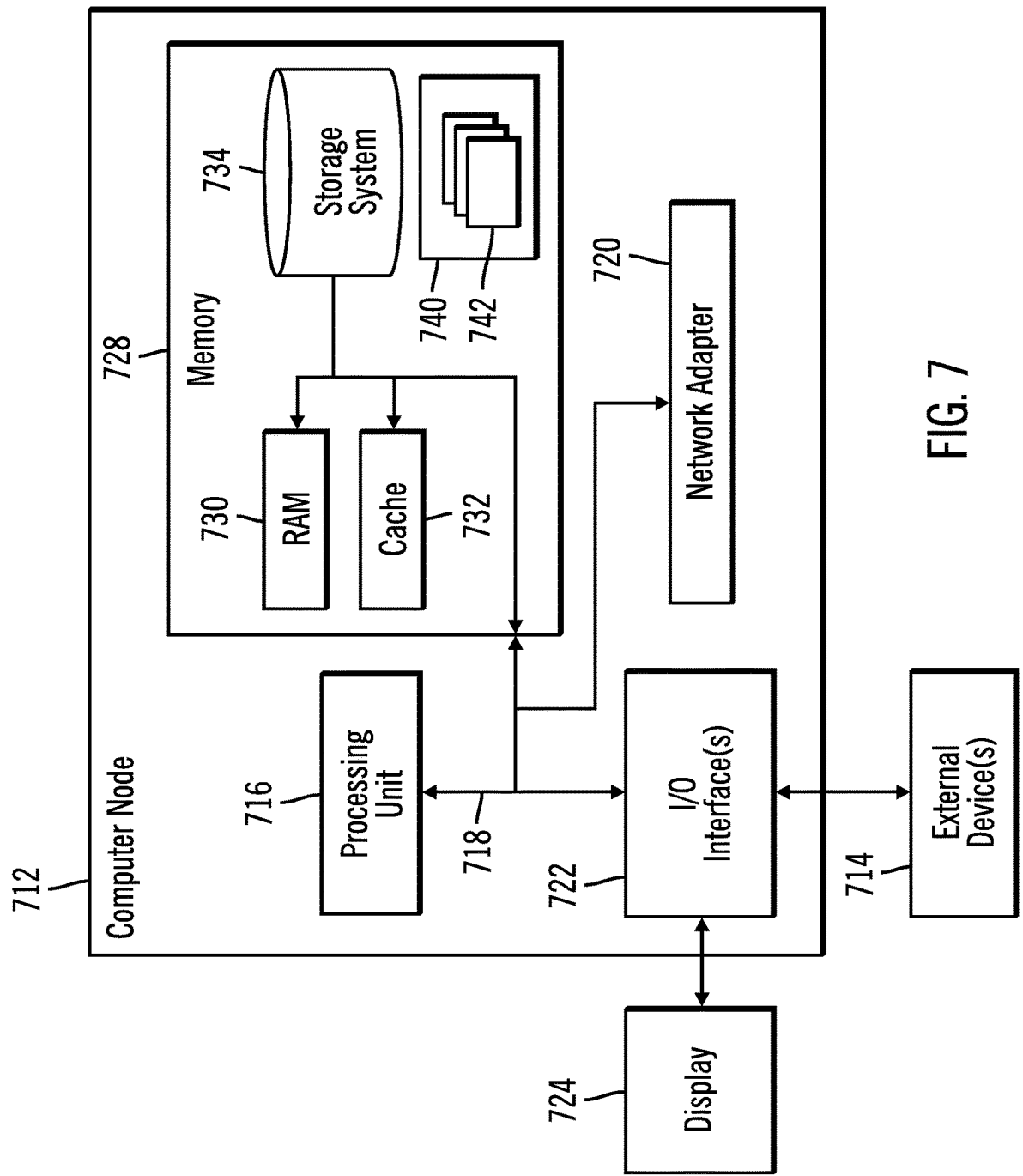
FIG. 7 illustrates a computing environment in accordance with certain embodiments.

FIG. 7 illustrates a computing environment in accordance with certain embodiments. Referring to FIG. 7, computer system 712 is only one example of a suitable computing system and is not intended to suggest any limitation as to the scope of use or functionality of embodiments of the invention described herein. Regardless, computer system 712 is capable of being implemented and/or performing any of the functionality set forth hereinabove.

The computer system 712 may be a computer system, which is operational with numerous other general purpose or special purpose computing system environments or configurations. Examples of well-known computing systems, environments, and/or configurations that may be suitable for use with computer system 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 712 may be described in the general context of computer system executable instructions, such as program modules, being executed by a computer system. Generally, program modules may include routines, programs, objects, components, logic, data structures, and so on that perform particular tasks or implement particular abstract data types. Computer system 712 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system 712 is shown in the form of a general-purpose computing device. The components of computer system 712 may include, but are not limited to, one or more processors or processing units 716, a system memory 728, and a bus 718 that couples various system components including system memory 728 to one or more processors or processing units 716.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 712 typically includes a variety of computer system readable media. Such media may be any available media that is accessible by computer system 712, and it includes both volatile and non-volatile media, removable and non-removable media.

System memory 728 can include computer system readable media in the form of volatile memory, such as random access memory (RAM) 730 and/or cache memory 732. Computer system 712 may further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by one or more data media interfaces. As will be further depicted and described below, system memory 728 may include at least one program product having a set (e.g., at least one) of program modules that are configured to carry out the functions of embodiments of the invention.

Program/utility 740, having a set (at least one) of program modules 742, may be stored in system memory 728 by way of example, and not limitation, as well as an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computer system 712 may also communicate with one or more external devices 714 such as a keyboard, a pointing device, a display 724, etc.; one or more devices that enable a user to interact with computer system 712; and/or any devices (e.g., network card, modem, etc.) that enable computer system 712 to communicate with one or more other computing devices. Such communication can occur via Input/Output (I/O) interfaces 722. Still yet, computer system 712 can communicate with one or more networks such as a local area network (LAN), a general wide area network (WAN), and/or a public network (e.g., the Internet) via network adapter 720. As depicted, network adapter 720 communicates with the other components of computer system 712 via bus 718. It should be understood that although not shown, other hardware and/or software components could be used in conjunction with computer system 712. Examples, include, but are not limited to: microcode, device drivers, redundant processing units, external disk drive arrays, RAID systems, tape drives, and data archival storage systems, etc.

In certain embodiments, the computing device 100, each mobile bot 110$a$ . . . 110$n$, each LIFI enabled mobile device 120$b$ . . . 120$p$, and each device in the network of devices 160 has the architecture of computer system 712.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:
    identifying a plurality of geographic locations of a physical region based on historical crowd density, historical network traffic, current crowd density, and current network traffic;
    prioritizing the plurality of geographic locations;
    determining a traversal route for a mobile bot in a plurality of mobile bots based on the prioritized geographic locations, wherein a number of the plurality of mobile bots is less than a number of the prioritized geographic locations; and
    sending the mobile bot along the traversal route, wherein the traversal route specifies a subset of the prioritized geographic locations for the mobile bot to travel to, specifies a time for each geographic location in the subset, and specifies a period of time for each geographic location in the subset, wherein the mobile bot provides a dynamic Light Fidelity (LIFI) extender router that acts as a network access point, wherein users at each geographic location in the subset are associated with the mobile bot for the period of time, and wherein each of the users has a LIFI enabled mobile device that communicates with a network of devices by sending data to the dynamic LIFI extender router via LIFI.

2. The computer-implemented method of claim 1, wherein the dynamic LIFI extender router provides authentication of a user of the users using the LIFI enabled mobile device to access an internet service provided by a device in the network of devices.

3. The computer-implemented method of claim 1, wherein target audience leaning criteria is used to route each mobile bot in the plurality of mobile bots in time and space.

4. The computer-implemented method of claim 1, wherein each mobile bot in the plurality of mobile bots receives a different traversal route that indicates multiple locations at different times.

5. The computer-implemented method of claim 1, further comprising operations for:
    storing one or more traversal routes of each mobile bot of the plurality of mobile bots for future reconfiguration and optimization.

6. The computer-implemented method of claim 1, wherein the plurality of mobile bots, a monitoring and control system, and a plurality of cameras are embedded in a scatternet ecosystem.

7. The computer-implemented method of claim 1, wherein the dynamic LIFI extender router communicates with the network of devices via one of LIFI and WIFI.

8. A computer program product, the computer program product comprising a computer readable storage medium having program code embodied therewith, the program code executable by at least one processor to perform operations for:
    identifying a plurality of geographic locations of a physical region based on historical crowd density, historical network traffic, current crowd density, and current network traffic;
    prioritizing the plurality of geographic locations;
    determining a traversal route for a mobile bot in a plurality of mobile bots based on the prioritized geographic locations, wherein a number of the plurality of mobile bots is less than a number of the prioritized geographic locations; and
    sending the mobile bot along the traversal route, wherein the traversal route specifies a subset of the prioritized geographic locations for the mobile bot to travel to, specifies a time for each geographic location in the subset, and specifies a period of time for each geographic location in the subset, wherein the mobile bot provides a dynamic Light Fidelity (LIFI) extender router that acts as a network access point, wherein users at each geographic location in the subset are associated with the mobile bot for the period of time, and wherein each of the users has a LIFI enabled mobile device that communicates with a network of devices by sending data to the dynamic LIFI extender router via LIFI.

9. The computer program product of claim 8, wherein the dynamic LIFI extender router provides authentication of a user of the users using the LIFI enabled mobile device to access an internet service provided by a device in the network of devices.

10. The computer program product of claim 8, wherein target audience leaning criteria is used to route each mobile bot in the plurality of mobile bots in time and space.

11. The computer program product of claim 8, wherein each mobile bot in the plurality of mobile bots receives a different traversal route that indicates multiple locations at different times.

12. The computer program product of claim 8, wherein the program code is executable by the at least one processor to perform operations for:

storing one or more traversal routes of each mobile bot of the plurality of mobile bots for future reconfiguration and optimization.

13. The computer program product of claim 8, wherein the plurality of mobile bots, a monitoring and control system, and a plurality of cameras are embedded in a scatternet ecosystem.

14. The computer program product of claim 8, wherein the dynamic LIFI extender router communicates with the network of devices via one of LIFI and WIFI.

15. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more memories, to perform operations comprising:
identifying a plurality of geographic locations of a physical region based on historical crowd density, historical network traffic, current crowd density, and current network traffic;
prioritizing the plurality of geographic locations;
determining a traversal route for a mobile bot in a plurality of mobile bots based on the prioritized geographic locations, wherein a number of the plurality of mobile bots is less than a number of the prioritized geographic locations; and
sending the mobile bot along the traversal route, wherein the traversal route specifies a subset of the prioritized geographic locations for the mobile bot to travel to, specifies a time for each geographic location in the subset, and specifies a period of time for each geographic location in the subset, wherein the mobile bot provides a dynamic Light Fidelity (LIFI) extender router that acts as a network access point, wherein users at each geographic location in the subset are associated with the mobile bot for the period of time, and wherein each of the users has a LIFI enabled mobile device that communicates with a network of devices by sending data to the dynamic LIFI extender router via LIFI.

16. The computer system of claim 15, wherein the dynamic LIFI extender router provides authentication of a user of the users using the LIFI enabled mobile device to access an internet service provided by a device in the network of devices.

17. The computer system of claim 15, wherein target audience leaning criteria is used to route each mobile bot in the plurality of mobile bots in time and space.

18. The computer system of claim 15, wherein each mobile bot in the plurality of mobile bots receives a different traversal route that indicates multiple locations at different times.

19. The computer system of claim 15, wherein the operations further comprise:
storing one or more traversal routes of each mobile bot of the plurality of mobile bots for future reconfiguration and optimization.

20. The computer system of claim 15, wherein the plurality of mobile bots, a monitoring and control system, and a plurality of cameras are embedded in a scatternet ecosystem.

* * * * *